US 10,445,559 B2

United States Patent
Joseph et al.

(10) Patent No.: US 10,445,559 B2
(45) Date of Patent: Oct. 15, 2019

(54) METHODS AND SYSTEMS FOR WARNING DRIVER OF VEHICLE USING MOBILE DEVICE

(71) Applicant: Wipro Limited, Bangalore (IN)

(72) Inventors: Sudheesh Joseph, Kochi (IN); Abin Mathew, Kanakkarl (IN)

(73) Assignee: Wipro Limited, Bangalore (IN)

( * ) Notice: Subject to any disclaimer, the term of this patent is extended or adjusted under 35 U.S.C. 154(b) by 177 days.

(21) Appl. No.: 15/463,735

(22) Filed: Mar. 20, 2017

(65) Prior Publication Data

US 2018/0247109 A1    Aug. 30, 2018

(30) Foreign Application Priority Data

Feb. 28, 2017 (IN) .............................. 201741007108

(51) Int. Cl.
*B60W 50/14* (2012.01)
*B60W 30/095* (2012.01)
(Continued)

(52) U.S. Cl.
CPC ......... *G06K 9/00255* (2013.01); *B60Q 5/006* (2013.01); *B60W 30/0956* (2013.01);
(Continued)

(58) Field of Classification Search
CPC .............. B60Q 5/006; B60W 2550/10; B60W 2550/14; B60W 30/0956; G06K 9/00255; G06K 9/00791; G06K 9/00778; G06K 9/00785; G06K 9/00798; G06K 9/00805; G06K 9/00812; G06K 9/00818; G06K 9/00825; G06K 9/00845; G06K 9/325; G06K 2209/15; G06T 2207/30236; G06T 2207/30248; G06T 2207/30252; G06T 2207/30256; G06T 2207/30261; G06T 2207/30264; G06T 2207/30268; B60R 2300/806; G08G 1/16; G08G 1/116

See application file for complete search history.

(56) References Cited

U.S. PATENT DOCUMENTS 8,144,002 B2    3/2012 Kiuchi
8,981,963 B2    3/2015 Emura et al.
(Continued)

FOREIGN PATENT DOCUMENTS

EP        3 070 700        9/2016
WO    WO 2016/127204    8/2016

OTHER PUBLICATIONS

Extended European Search Report issued in the European Patent Office in counterpart European Application No. 17178886.2, dated Jan. 25, 2018, 8 pages.

*Primary Examiner* — Nathanael Aynalem
(74) *Attorney, Agent, or Firm* — Finnegan, Henderson, Farabow, Garrett & Dunner, LLP

(57) ABSTRACT

A method and system for warning a driver of a vehicle using a mobile device is disclosed. The method includes capturing at least one facial aspect of the driver and a path view visible ahead of the vehicle up to a predefined distance. The method further includes identifying using image analytics at least one path event demanding attention of the driver based on a path view and a field of view of the driver. The method includes detecting absence of a driver response in response to identifying the at least one path event within the field of view of the driver. The method further includes extracting driver details associated with the driver. The method includes issuing a notification to the driver based on the driver details, when the absence of the driver response is detected.

18 Claims, 7 Drawing Sheets

(51) Int. Cl.
*G06K 9/00* (2006.01)
*B60Q 5/00* (2006.01)
*H04N 5/232* (2006.01)
*H04N 5/247* (2006.01)

(52) U.S. Cl.
CPC ......... *B60W 50/14* (2013.01); *G06K 9/00791* (2013.01); *H04N 5/23222* (2013.01); *H04N 5/247* (2013.01); *B60W 2420/42* (2013.01); *B60W 2550/10* (2013.01)

(56) References Cited

U.S. PATENT DOCUMENTS

| | | | |
|---|---|---|---|
| 9,460,601 B2 | 10/2016 | Mimar | |
| 2007/0222617 A1 | 9/2007 | Chai et al. | |
| 2009/0237226 A1* | 9/2009 | Okita | B60W 10/184 340/435 |
| 2010/0157061 A1 | 6/2010 | Katsman et al. | |
| 2011/0077028 A1 | 3/2011 | Wilkes, III et al. | |
| 2012/0002028 A1* | 1/2012 | Takahashi | B60K 37/04 348/78 |
| 2012/0242819 A1* | 9/2012 | Schamp | G08B 21/06 348/78 |
| 2012/0271484 A1 | 10/2012 | Feit et al. | |
| 2013/0249395 A1* | 9/2013 | Hatakeyama | B60K 35/00 315/77 |
| 2015/0291216 A1* | 10/2015 | Sato | B60W 50/14 701/23 |
| 2015/0363657 A1 | 12/2015 | Shigemura | |
| 2016/0114806 A1 | 4/2016 | Ao et al. | |
| 2016/0214619 A1* | 7/2016 | Na | B60W 10/20 |
| 2018/0026669 A1* | 1/2018 | Edwards | H04B 1/3877 455/418 |

\* cited by examiner

METHODS AND SYSTEMS FOR WARNING DRIVER OF VEHICLE USING MOBILE DEVICE

TECHNICAL FIELD

This disclosure relates generally to vehicle warning systems and more particularly to methods and systems for warning driver of vehicle using mobile device

BACKGROUND

While driving a vehicle, a driver may be distracted and thus may not notice some events or objects in the path of the vehicle. Such events or objects may lead to accidents. By way of an example, a pedestrian walking in to the way of the vehicle or a bicycle suddenly entering from a side road, may not be noticed by the driver. Conventional warning systems issue a warning to the driver, however, these systems are rigidly built in the vehicle itself and are mostly dependent on the vehicle that is being driven.

SUMMARY

In one embodiment, a method for warning a driver of a vehicle using a mobile device is disclosed. The method includes capturing, by at least one first camera of the mobile device, at least one facial aspect of the driver; capturing, by at least one second camera of the mobile device, a path view visible ahead of the vehicle up to a predefined distance; identifying using image analytics, by the mobile device, a field of view of the driver, based on the at least one facial aspect and at least one path event demanding attention of the driver, based on the path view and the field of view of the driver; detecting, by the mobile device, absence of a driver response in response to identifying the at least one path event within the field of view of the driver; extracting, by the mobile device, driver details associated with the driver; and issuing, by the mobile device, a notification to the driver based on the driver details, when the absence of the driver response is detected.

In another embodiment, a mobile device for warning a driver of a vehicle is disclosed. The mobile device includes a processor, at least one first camera coupled to the processor and being configured to capture at least one facial aspect of the driver; at least one second camera coupled to the processor and being configured to capture a path view visible ahead of the vehicle up to a predefined distance; and a memory communicatively coupled to the processor, wherein the memory stores processor instructions, which, on execution, causes the processor to identify using image analytics a field of view of the driver, based on the at least one facial aspect and at least one path event demanding attention of the driver, based on the path view and the field of view of the driver; detect absence of a driver response in response to identifying the at least one path event within the field of view of the driver; extract driver details associated with the driver; and issue a notification to the driver based on the driver details, when the absence of the driver response is detected.

In yet another embodiment, a non-transitory computer-readable storage medium having stored thereon, a set of computer-executable instructions causing a computer comprising one or more processors to perform steps comprising: capturing, by at least one first camera of the mobile device, at least one facial aspect of the driver; capturing, by at least one second camera of the mobile device, a path view visible ahead of the vehicle up to a predefined distance; identifying using image analytics, by the mobile device, a field of view of the driver, based on the at least one facial aspect and at least one path event demanding attention of the driver, based on the path view and the field of view of the driver; detecting, by the mobile device, absence of a driver response in response to identifying the at least one path event within the field of view of the driver; extracting, by the mobile device, driver details associated with the driver; and issuing, by the mobile device, a notification to the driver based on the driver details, when the absence of the driver response is detected.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF THE DRAWINGS

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
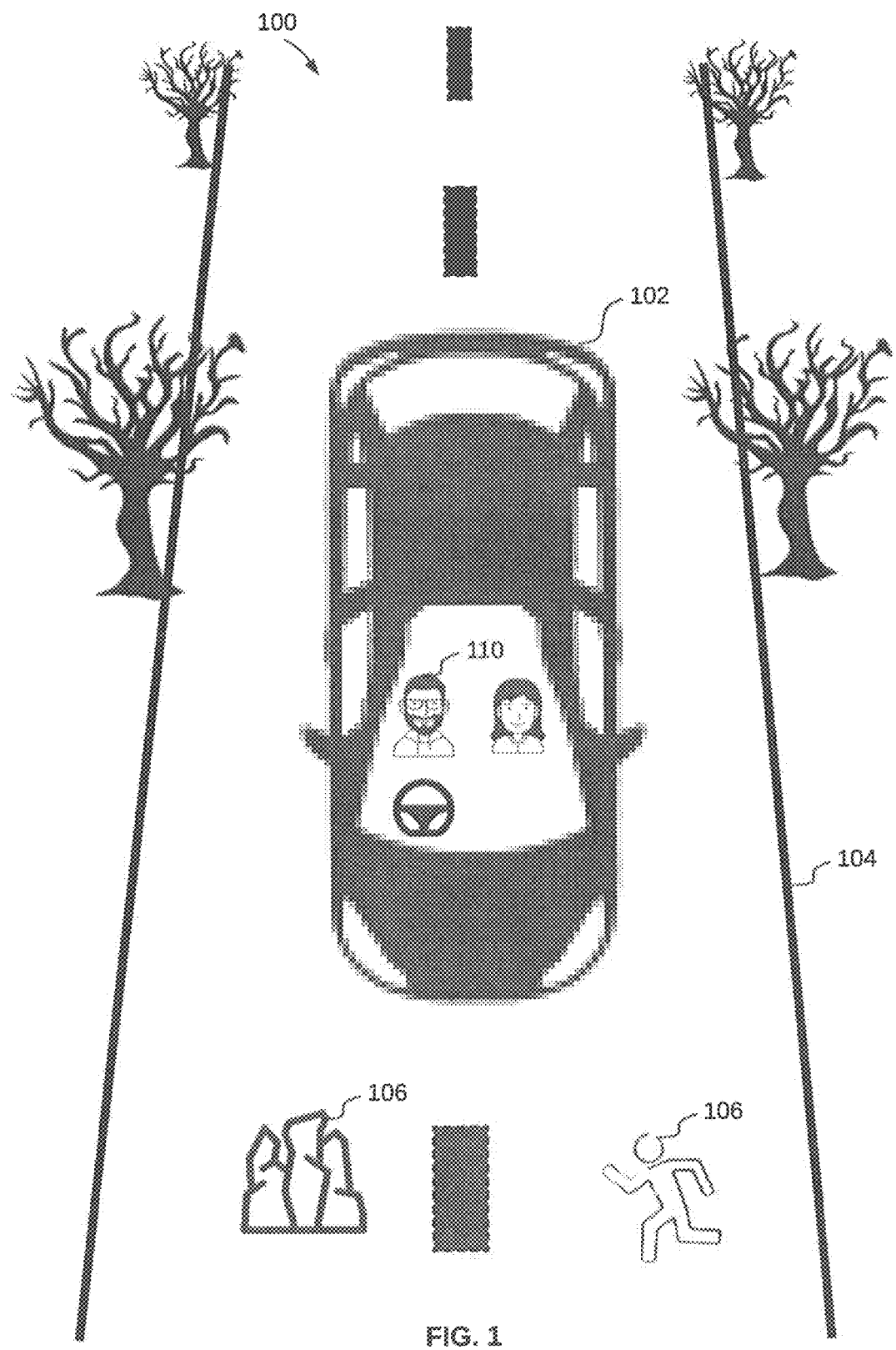
FIG. 1 illustrates an exemplary environment in which various embodiments may be employed.

Referring to FIG. 1, an exemplary environment 100 in which various embodiments may be employed, is illustrated. Environment 100 illustrates a vehicle 102 driving through a path 104, which may be a road or any other terrain that vehicle 102 can ply on. Examples of vehicle 102 may include, but are not limited to a car, a van, a sports utility vehicle, a multi utility vehicle, a bus, a minibus, or a truck. While driving through path 104, there might be obstructions 106 in path 104 that a driver 110 of vehicle 102 may fail to notice for various reasons, which may include, but are not limited to driver 110's lack of attention or any distraction, unexpected or sudden appearance of obstructions 106, or driver 110's viewing angle not including one or more of obstructions 106. Examples of obstructions 106 may include, but are not limited to boulders falling due to a landslide in a mountainous terrain, pedestrians walking into the way of vehicle 110, or a bicycle entering from a side road. Unless driver 110 is notified beforehand regarding obstructions 106 and relevant incidents happening in front of vehicle 102, these may lead to a fatal accident. Driver 110 may be warned regarding obstructions 106 and relevant incidents by way of a system 200 described in conjunction with FIG. 2.

Figure 2:
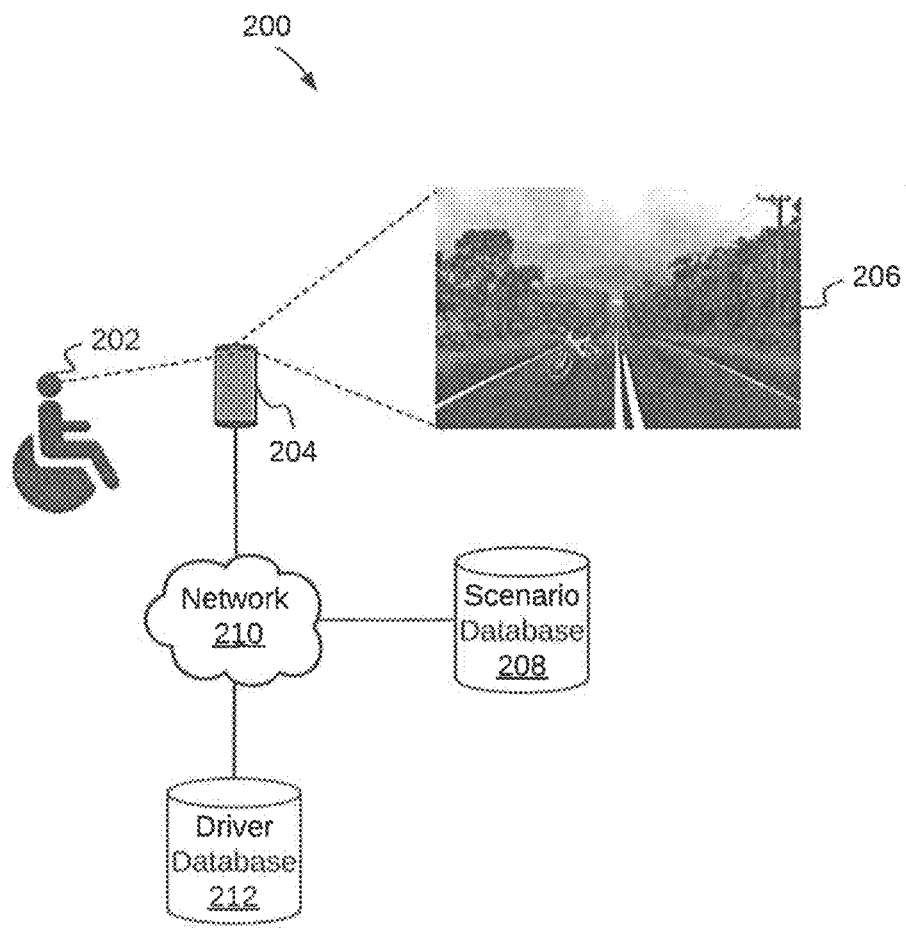
FIG. 2 illustrates a block diagram of a system for warning a driver of a vehicle using a mobile device, in accordance with an embodiment.

Referring now to FIG. 2, a block diagram of system 200 for warning a driver 202 of a vehicle (not shown in FIG. 2) using mobile device 204 is illustrated, in accordance with an embodiment. Examples of mobile device 204 may include, but are not limited to a smart phone, a tablet, and a phablet. Mobile device 204 includes one or more first cameras (not shown in FIG. 2), which are front facing cameras, and one or more second cameras (not shown in FIG. 2), which are rear facing cameras. Mobile device 204 is further explained in detail in conjunction with FIGS. 3 and 4

To enable the warning mechanism, mobile device 204 may be mounted on windscreen of the vehicle using any existing mobile mounting device, such that, the one or more first cameras is able to capture one or more facial aspects of driver 202, while being seated in the vehicle, and the one or more second camera are able to capture a path view 206 visible on the road ahead of the vehicle up to a predefined distance. One or more facial aspects may include, but are not limited to gaze direction, facial direction, or eye position of driver 202. Mobile device 204 may alternatively be kept on the vehicle's dashboard using a mobile stand, given that the above discussed criteria are satisfied.

To initialize system 200, an accurate placement of mobile device 204 within the vehicle may first be established. To this end, a mobile device placement position may be determined using the one or more first cameras and the one or more second cameras. By way of an example, driver 202 may first open an application associated with system 200 installed in his/her smart phone. Opening the application, activates the front facing camera and the rear facing camera of the smart phone. While both the front facing camera and the rear facing camera are on, driver 202 slowly moves the smart phone across the vehicle's windscreen. When the application determines that a particular position on the windscreen is apt for accurately capturing the one or more facial aspects of driver 202 as well as path view 206 visible in front of the vehicle up to the predefined distance, the application may prompt driver 202 using a notification, which may be a pop-up message or a predefined sound (for example, a long beep). Driver 202 thereafter mounts the smart phone on that particular position. A subsequent displacement of the smart phone from this position may lead to the application prompting driver 202 to modify its placement.

Once mobile device 204 has been accurately positioned, the one or more first cameras capture the one or more facial aspects of driver 202 to determine the field of view of driver 202. Additionally, the one or more second cameras capture path view 206, which is stored as an image. The one or more second cameras constantly keep on capturing multiple path views and mobile device 204 stores them as images. Contemporaneous with capturing path view 206 and storing it as an image, mobile device 204 compares this image with scenarios that would require attention of driver 202. This is further explained in detail in conjunction with FIGS. 4 and 5. These scenarios are stored in a scenario database 208, which may be accessed by mobile device 204 through a network 210. Examples of network 210 may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Alternatively, a local copy of scenario database 208 may be stored within memory of mobile device 204. This local copy may be regularly updated after a predefined time interval by synching it with scenario database 208, via network 210. Examples of various scenarios included in scenario database 208 may include, but are not limited to: vehicle ahead giving an indication to turn or stop, a passenger or vehicle crossing in front of the road in the cover of another vehicle ahead, a low beam vehicle coming in front of the vehicle in the cover of a high beam vehicle and thus being unnoticed.

Based on comparison of path view 206 with scenarios saved in scenario database 208, mobile device 204 may determine that path view 206 includes a situation (a bicycle stranded in middle of the road) that requires driver 202's attention. Subsequent to detecting the situation, mobile device 204 may detect absence of driver 202's response to the situation. Driver 202's response (or absence thereof) may be determined based on one or more of biometric data associated with driver 202 or changing vehicle attributes (for example, vehicle deceleration, vehicle acceleration, or sudden change in vehicle orientation).

In response to detecting absence of driver 202's response, mobile device 204 retrieves details associated with driver 202 from a driver database 212 via network 210. Driver database 212 stores information regarding multiple drivers, which may include driving pattern history of drivers, physical abilities of drivers (for example, eye-sight, color sensitivity, past accidents, or challans issued by traffic police). Mobile device 204 may store a local copy of driver database 212, which may be regularly updated by synching with driver database 212 via network 210. Based on these details associated with driver 202, mobile device 204 decides whether a notification or warning should be given to driver 202 in response to detecting absence of driver 202's response to the situation identified in path view 206. This is further explained in detail in conjunction with FIGS. 3 and 4.

The use of mobile device 204 as a driver warning device ensures that the driver warning system is independent of the vehicle being driven. Moreover, as the driving history of the driver, driver efficiency, road condition, and weather condition are taken into consideration to issue warning/notifications, issuing of annoying or redundant warnings/notifications are avoided. As a result, relevant and precise warnings are issued to the driver in order to avoid an impending accident.

Figure 3:
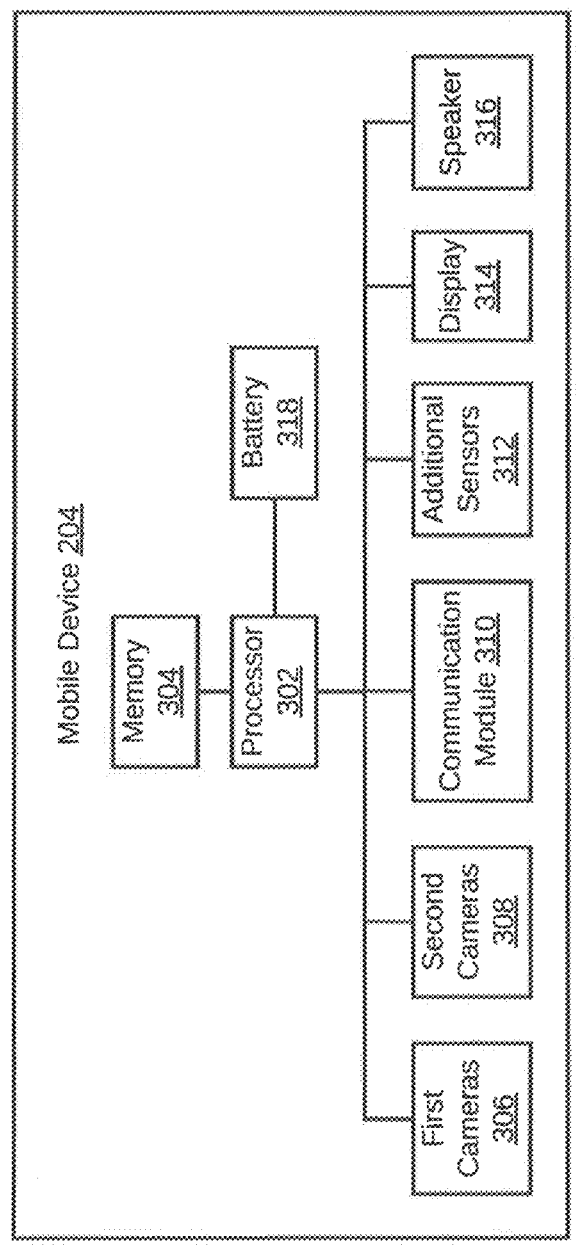
FIG. 3 illustrates a block diagram of a mobile device for warning a driver of a vehicle, in accordance with an embodiment.

Referring now to FIG. 3, a block diagram of mobile device 204 for warning a driver of a vehicle is illustrated, in accordance with an embodiment. Mobile device 204 includes a processor 302 that is coupled to a memory 304. Memory 304 stores instructions for processor 302, which, on execution, causes processor 302 to perform desired operations. Memory 304 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Various module and engines in memory 304 are further explained in detail in conjunction with FIG. 4.

Mobile device 204 further includes one or more first cameras 306 (which may be front cameras in case of a smart phone) to capture one or more facial aspects of the driver and one or more second cameras 308 (which may be rear cameras in case of a smart phone) to capture path views ahead of the vehicle. Once an application on mobile device 204 is activated, one or more first cameras 306 and one or more second camera 308 continuously capture the one or more facial aspects and the path views respectively, until the driver deactivates the application. Examples of first cameras 306 and second cameras 308, may include, but are not limited to a depth camera, an infrared light camera, a visible light camera, a position tracking camera, and an eye-tracking camera. The information captured by one or more first cameras 306 and one or more second cameras 308 may be shared with processor 302.

To further take a decision on whether to issue a notification or warning to the driver or not, based on information captured by one or more first cameras 306 and one or more second cameras 308, mobile device 204 further includes a communication module 310 (coupled to processor 302) that enables mobile device 204's access to scenario database 208 and driver database 212, or communication with other external devices or systems. Communication module 310 may support multiple communication protocols. Examples of these communication protocols may include, but are not limited to WLAN, Wi-Fi, LTE, WiMAX, GPRS, Bluetooth, Zigbee, Infrared, NearBytes, and NFC.

In addition to capturing the driver's facial aspects and path views ahead of the vehicle, the driver's response or reaction to a situation in the path view that may lead to an accident, may be captured by additional sensors 312 coupled to processor 302. Examples of additional sensors 312 may include, but are not limited to a 3D inclinometer sensor, accelerometer, gyroscope, pressure sensor, heat sensor, ambient light sensor, a compass, variometer, a tactile sensor, and a Global Positioning System (GPS) sensor. By way of an example, a gyroscope and/or an accelerometer may be used to detect sudden deceleration or acceleration of the vehicle by mobile device 204 placed inside the vehicle.

To issue notifications or warning to the driver, based on the driver details and absence of the driver's response, a display 314 and a speaker 316 (coupled to processor 302) may be used. Display 314 may be a touch screen that enables the driver to interact with mobile device 204. Display 314, for example, may be a Plasma display, a Liquid Crystal Display (LCD), a Light Emitting Diode (LED) display, an Organic Light Emitting Diode (OLED) display, and an Active Matrix OLED (AMOLED) display. Lastly, mobile device 204 also include a battery 316 in order to work independent of a power source.

Figure 4:
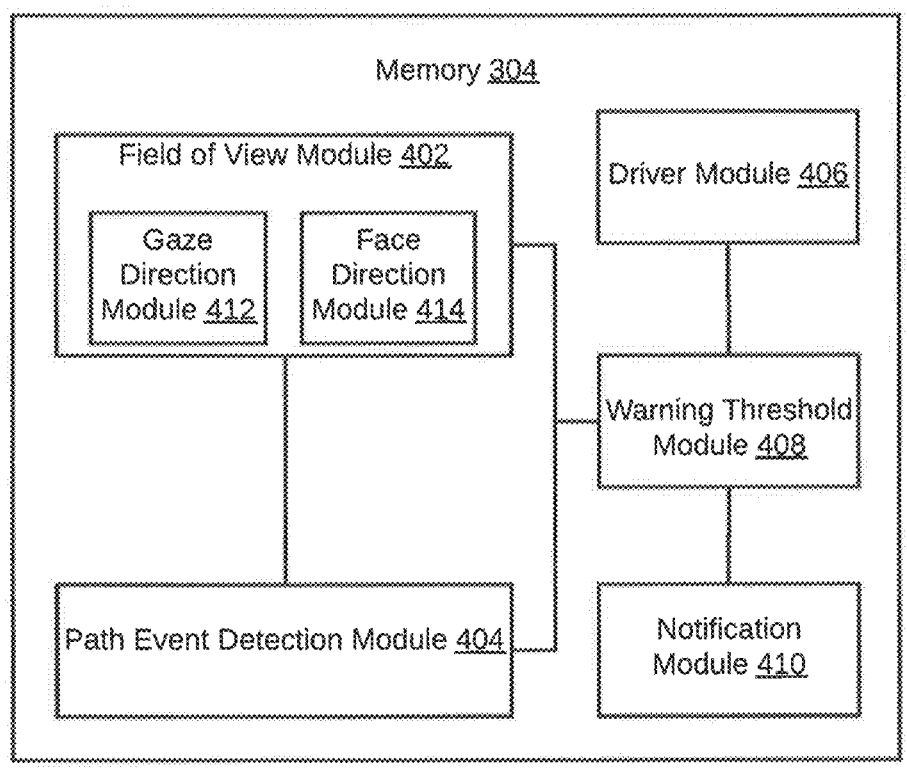
FIG. 4 illustrates a block diagram of various components within a memory of the mobile device that is configured to warn a driver of a vehicle, in accordance with an embodiment.

Various functionalities performed by mobile device 204 are further explained in detail in conjunction with FIG. 4 illustrating various modules and engines within memory 304.

Referring now to FIG. 4, a block diagram of various components within memory 304 of mobile device 204 that is configured to warn a driver of a vehicle is illustrated, in accordance with an embodiment. Memory 304 includes a field of view module 402, a path event detection module 404, a driver module 406, a warning threshold module 406, and a notification module 410.

The one or more facial aspects of the driver captured by one or more first cameras 306, which are stored as images of the driver's face, are used by field of view module 402 to identify a field of view of the driver. The one or more facial aspects of the driver may include, but are not limited to gaze direction, facial direction, or eye position of the driver. A gaze direction module 412 uses image analytics to identify the driver's eyes and the gaze direction of the driver and a face direction module 414 uses image analytics to identify face of the driver and the facial direction of the driver based on the one or more facial aspects captured as an image. These inputs, i.e., driver's eyes, the gaze direction, and the facial direction, are used by field of view module 402 to determine the field of view of the driver. This is further explained in detail in conjunction with FIG. 5.

Further, the path view captured by one or more second cameras 308 is an image of the road ahead or any terrain that the vehicle is plying on. The image may be stored in memory 304 contemporaneous of it being captured by one or more second cameras 308. Path event detection module 404 performs image analytics on the path view image, to identify one or more path events (or situations) that demand attention of the driver. Path event detection module 404 compares the path view image with multiple scenarios that demand the driver's attention to avoid an accident. Once a match is determined, path event detection module 404 identifies one or more path events that demand the driver's attention. This is further explained in detail in conjunction with FIG. 5.

Once path event detection module 404 has identified the one or more path events within the field of view of the driver, driver module 406 may detect absence of a response from the driver. Driver module 406 may determine the driver response or absence thereof based on biometric data associated with the driver or changing vehicle attributes that may include one or more of vehicle deceleration, vehicle acceleration, or sudden change in vehicle orientation. Driver module 406 further extracts driver details associated with the driver from one or more of facial aspects of the driver, biometric data associated with the driver, or driver database 212. Driver module 406 may additionally extract environment details associated with environment around the vehicle and vehicle details associated with the vehicle. This is further explained in detail in conjunction with FIGS. 5 and 6.

When driver module 406 detects the absence of response from the driver, a warning threshold module 408 determines a warning zone and a critical zone for the vehicle based on each of the driver details, the environment details, and the vehicle details. Warning threshold module 408 re-calculates the warning zone and the critical zone at regular intervals as they may vary based on driver details, the environment details, and the vehicle details, which are dynamic and thus constantly keep on changing. The warning zone depends on the efficiency of the driver and the critical zone depends on the environment details and the vehicle details. This is further explained in detail in conjunction with FIG. 6.

When the vehicle enters the warning zone, warning threshold module 408 concludes that the threshold for issuing the notification in order to warn the driver has been crossed. Thereafter, a notification module 410 issues a notification to the driver based on the extracted driver details. The notification is issued to warn the driver of an impending event within the field of view of the driver, which is not being acted up by the driver. Notification module 410 may issue the notification or warning in the form of audio alarms, customized audio messages (for example, 'slow down,' 'apply brakes,' 'look in front,' 'wake up'), or video messages on display 314 of mobile device 204. This is further explained in detail in conjunction with FIG. 5.

Figure 5:
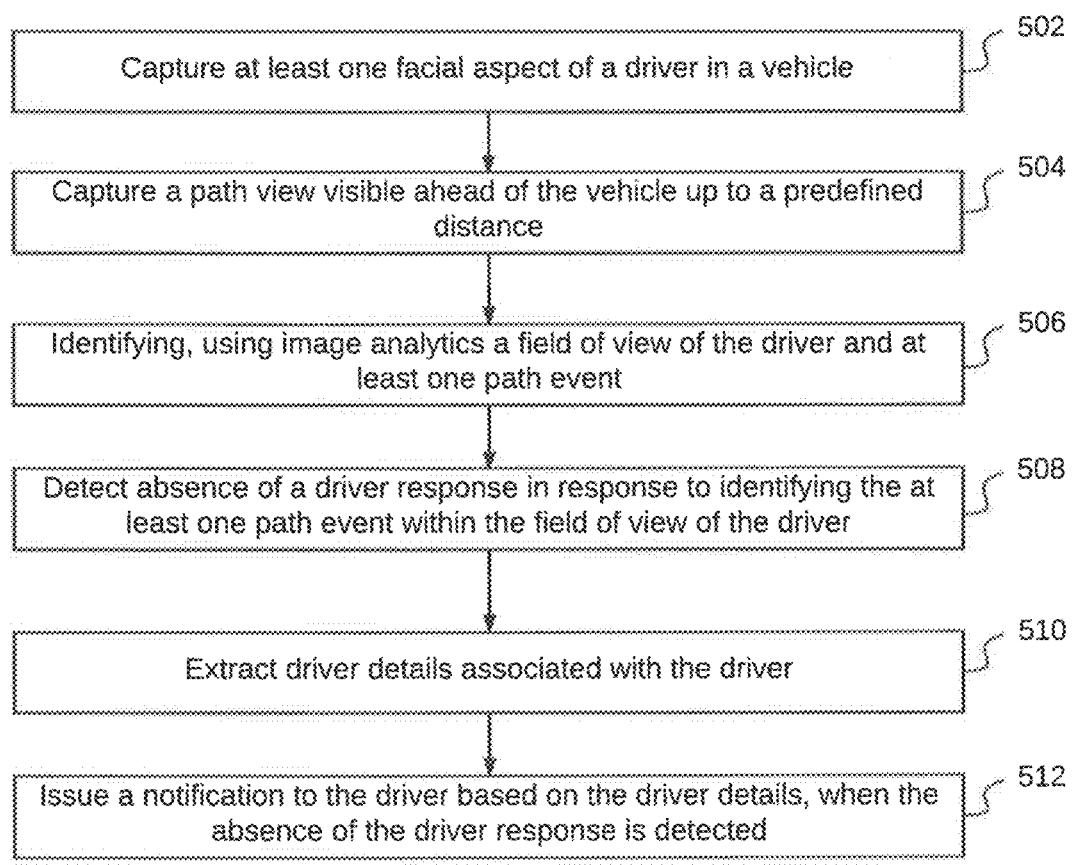
FIG. 5 illustrates a flowchart of a method for warning a driver of a vehicle using a mobile device, in accordance with an embodiment.

Referring now to FIG. 5, a flowchart of a method for warning a driver of a vehicle using mobile device 204 is illustrated, in accordance with an embodiment. To this end, when the driver is seated inside the vehicle, at 502, one or more first cameras 306 track the face of the driver and capture one or more facial aspects of the driver. The one or more facial aspects of the driver may include, but are not limited to gaze direction, facial direction, or eye position. One or more first cameras 306 may continuously capture the one or more facial aspects. Alternatively, the frequency at which the one or more facial aspects are captured may be defined by a system administrator and may be subsequently modified by the driver in order to conserver backup of battery 318. The one or more facial aspects are captured by storing images of drivers face in memory 304.

At 504, one or more second cameras 308 capture a path view visible ahead of the vehicle up to a predefined distance. One or more second cameras 308 may continuously capture path views or alternatively, the frequency at which the path views are captured may be defined by a system administrator. The path view may be an image of the road ahead or any terrain that the vehicle is plying on. The image may be stored in memory 304 contemporaneous of it being captured by one or more second cameras 308. The predefined distance may be defined by the driver before initializing an application built in mobile device 204. Alternatively, the predefined distance may be automatically fixed based on the line of sight of the driver captured by one or more first cameras 306.

At 506, mobile device 204 uses image analytics on the one or more facial aspects captured by one or more first cameras 306 to identify a field of view of the driver. Image analytics enable mobile device 204 to identify the driver's eyes, the gaze direction, and the facial direction based on the one or more facial aspects captured as an image. These inputs, i.e., driver's eyes, the gaze direction, and the facial direction, are used to determine the field of view of the driver. Similarly, image analytics performed on the path view image, enable mobile device 204 to identify one or more path events that demand attention of the driver at 506. To this end, contemporaneous with the path view image being captured, the path view image is compared with multiple scenarios that demand the driver's attention to avoid an accident. These scenarios are either stored locally by mobile device 204 or are stored in scenario database 208 located remotely. Once a match is determined, the one or more path events that demand the driver's attention are identified. By way of an example, referring back to FIG. 2, in path view 206 a bicycle is obstructing the path of driver 202's vehicle. When image of path view 206 is compared with multiple scenarios, a match is found and thus, a path event of bicycle obstructing the road is identified.

In response to identifying the one or more path events within the field of view of the driver, mobile device 204, at 508, detects absence of a response from the driver. The driver response may be determined based on biometric data associated with the driver or changing vehicle attributes that may include one or more of vehicle deceleration, vehicle acceleration, or sudden change in vehicle orientation. In other words, a combination of all these factors may be used to detect the driver's response. The biometric data, for example, may include change in facial expressions of the driver that is captured through first camera 306. By way of another example, the biometric data may include, sudden increase in pulse rate/heartbeat or dilation of pupils. These biometric data may be captured by additional sensors 312 in mobile device 204. The vehicle deceleration, vehicle acceleration, or sudden change in vehicle orientation, may also be captured by additional sensors 312.

Thereafter, at 510, mobile device 204 extracts driver details associated with the driver. The driver details may be extracted from one or more of facial aspects of the driver, biometric data associated with the driver, or driver database 212. In other words, a combination of these sources may be used to extract the driver details. Driver database 212 may include information regarding driving pattern history of the driver, physical abilities of the driver (for example, eyesight, color sensitivity, past accidents, depression, trauma, medical history, or challans issued by traffic police). In an embodiment, a questionnaire may be presented to the driver after initialization of the application on mobile device 204, and the driver may be required to provide the above discussed information as answers to the questionnaire. This information may then be stored against the driver's profile in memory 304 for future use. In addition to extracting the driver details, environment details associated with environment around the vehicle and vehicle details associated with the vehicle may also be retrieved. This is further explained in detail in conjunction with FIG. 6.

When the absence of response from the driver is detected, mobile device 204 issues a notification to the driver at 512, based on the extracted driver details. The notification is issued to warn the driver of an impending event within the field of view of the driver, which is not being acted up by the driver. The extracted driver details are used by mobile device 204 to avoid issuing annoying and redundant notifications to the driver, in case the driver is an expert. The expertise of the driver may be determined based on driving pattern history of the driver. Mobile device 204 treats different drivers on different scales based on their respective expertise and physical or health limitations. Thus, different warning levels may be set for different drivers. Warning levels may be set based additionally on the environment details associated with environment around the vehicle and the vehicle details. This is explained in detail in conjunction with FIG. 6. In an embodiment, ranks or ratings may be assigned to drivers based on the extracted details, and the decision to issue notifications may be made based on these driver ratings. By way of an example, in response to detecting a path event and absence of driver's reaction, a higher rated driver might not be issued a warning by way of a notification. However, a lower rated driver might be issued a warning for the same path event.

The notification or warning may be issued in the form of audio alarms, customized audio messages (for example, 'slow down,' 'apply brakes,' 'look in front.' 'wake up'), or video messages on display 314 of mobile device 204. In an embodiment, when mobile device 204 is in communication with the on board vehicle management system, mobile device 204 may send instructions to the vehicle management system to automatically apply brakes or steer the vehicle in a safe direction.

Figure 6:
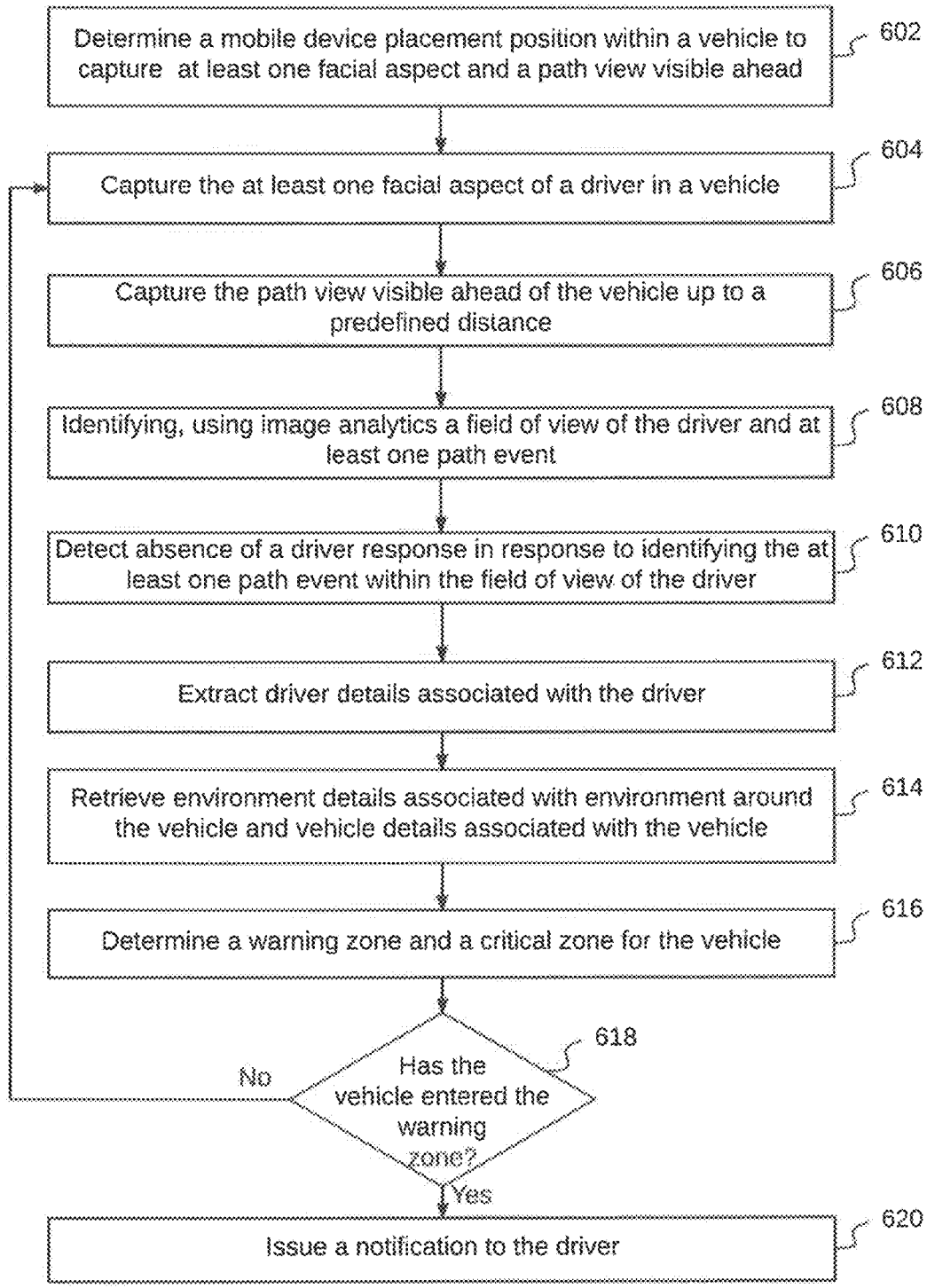
FIG. 6 illustrates a flowchart of a method for warning a driver of a vehicle using a mobile device, in accordance with another embodiment.

Referring now to FIG. 6, a flowchart of a method for warning a driver of a vehicle using mobile device 204 is illustrated, in accordance with another embodiment. At 602, mobile device 204 determines a mobile device placement position within the vehicle to capture one or more facial aspects and a path view visible ahead of the vehicle. This has been explained in detail in conjunction with FIG. 2. Once mobile device 204 is mounted on the mobile device placement position, one or more first cameras 306 capture the one or more facial aspect of the driver at 604.

Thereafter, one or more second camera 306 capture the path view visible ahead of the vehicle up to the predefined distance at 606. Mobile device 204 then uses image analytics, at 608, to identify a field of view of the driver and one or more path events. At 610, mobile device 204 detects absence of a response from the driver in response to identifying the one or more path events within the field of view of the driver. At 612, mobile device 204 extracts driver details associated with the driver. Steps 604 to 612 have been explained in detail in conjunction with FIG. 5.

At 614, mobile device 204 retrieves environment details associated with environment around the vehicle. The environment details include one or more of road condition, weather condition, or traffic condition and may be retrieved from one or more databases via network 210 or by using one or more second cameras 308. Traffic condition, for example, may include change in speed of obstacle ahead of the vehicle, appearance of new obstacle, and signaling change of vehicles ahead of the vehicle. The one or more databases, for example, may be one of a meteorological database (for live weather conditions), a traffic database, or a road database. At 614, mobile device 204 additionally retrieves vehicle details associated with the vehicle. The vehicle details include one or more of brake conditions, fire condition, tire pressure, current speed of the vehicle, or loaded weight of the vehicle. Mobile device 204 may be communicatively coupled to a vehicle management system onboard the vehicle and may accordingly retrieve these vehicle details.

Thereafter, at 616, mobile device 204 determines a warning zone and a critical zone for the vehicle based on each of the driver details, the environment details, and the vehicle details. The warning zone is followed by the critical zone. The sum total of depths of the warning zone and the critical zone may be the distance separating the vehicle from an obstruction on the road ahead of the vehicle. The warning zone and the critical zone are re-calculated at regular intervals as they may vary based on driver details, the environment details, and the vehicle details, which are dynamic and thus constantly keep on changing.

As the warning zone depends on the efficiency of the driver, depth of the warning zone varies from driver to driver. When the vehicle enters the warning zone, attention of the driver is immediately required, so that, the vehicle does not enter the critical zone. The threshold for issuing the notification in order to warn the driver is crossed, when the vehicle enters the warning zone.

The critical zone succeeds the warning zone and is determined based on the environment details and the vehicle details retrieved by mobile device 204. If the vehicle enters the critical zone, the possibility of an accident becomes very high. In an embodiment, with increase in depth of the critical zone, the depth of the warning zone may decrease. By, way of an example, if weather conditions are adverse and/or vehicle condition is poor, the warning zone for the vehicle may be much smaller, when compared with the critical zone. In other words, the threshold for issuing notification to warn the driver decreases and the probability of an accident becomes much higher. In such cases, a second notification may be issued, when the vehicle enters the critical zone, in order to give a second warning to the driver.

At 618, mobile device 204 performs a check to determine whether the vehicle has entered the warning zone or not. If the vehicle has entered the warning zone, mobile device 204 issues a notification to the driver in order to warn the driver. However, if the vehicle has not entered the warning zone yet, the control goes back to 604.

Figure 7:
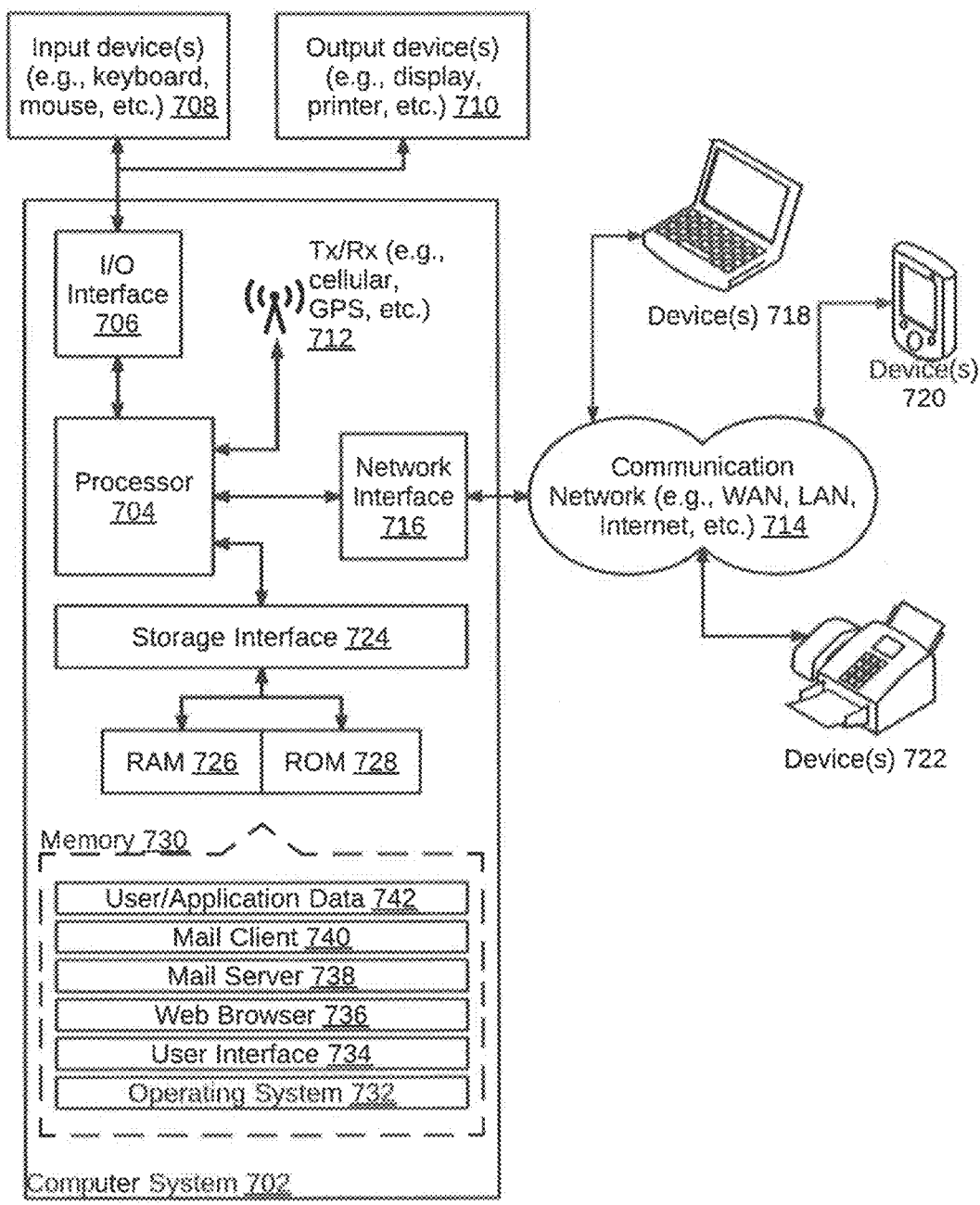
FIG. 7 illustrates a block diagram of an exemplary computer system for implementing various embodiments.

FIG. 7 is a block diagram of an exemplary computer system for implementing various embodiments. Computer system 702 may comprise a central processing unit ("CPU" or "processor") 704. Processor 704 may comprise at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., Texas Instruments WiLink WL1283, Broadcom BCM4550IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, a user interface 734, a web browser 736, a mail server 738, a mail client 740, a user/application data 742 (e.g., any data variables or data records discussed in this disclosure), etc. Operating system 732 may facilitate resource management and operation of computer system 702. Examples of operating system 732 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 702 may implement web browser 736 stored program component. Web browser 736 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Rash, JavaScript, Java, application programming interfaces (APIs), etc. In some embodiments, computer system 702 may implement mail server 738 stored program component. Mail server 738 may be an Internet mail server such as Microsoft Exchange, or the like, The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement mail client 740 stored program component. Mail client 740 may be a mail viewing application, such as Apple Mail, Microsoft Entourage, Microsoft Outlook, Mozilla Thunderbird, etc.

In some embodiments, computer system 702 may store user/application data 742, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide methods and systems for warning driver of vehicle using mobile device. The use of any mobile device, which for example, may be smart phone of the driver, ensures that the driver warning system is independent of the vehicle being driven. Moreover, as the method takes into consideration the driving history of the driver, driver efficiency, road condition, and weather condition, issuing of annoying or redundant warnings/notifications to the driver are avoided. As a result, relevant and precise warnings are issued to the driver in order to avoid an impending accident.

The specification has described methods and systems for warning driver of vehicle using mobile device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for warning a driver of a vehicle using a mobile device, the method comprising:
    capturing, by at least one first camera of the mobile device, at least one facial aspect of the driver;
    capturing, by at least one second camera of the mobile device, a path view visible ahead of the vehicle up to a predefined distance;
    identifying using image analytics, by the mobile device, a field of view of the driver based on the at least one facial aspect and identifying at least one path event demanding attention of the driver based on the path view and the identified field of view of the driver;
    detecting, by the mobile device, absence of a driver response in response to identifying the at least one path event within the field of view of the driver;
    extracting, by the mobile device, driver details associated with the driver; and
    determining, by the mobile device, a warning zone and a critical zone, with respect to a location of the identified path event, in response to, the detected absence of the driver response,
        wherein, the warning zone is determined based on the extracted driver details and the critical zone is determined based on environment details and vehicle details associated with the vehicle,
        wherein a sum of depths of the determined warning zone and critical zone is same as a distance of the vehicle from the location of the identified path event, and
        wherein the depths of the determined warning zone and the critical zone is dynamically adjusted based on the extracted driver details, the environment details, and the vehicle details;
    issuing, by the mobile device, a first notification to the driver based on the driver details, when the vehicle enters the warning zone in order to stop the vehicle from entering the critical zone; and
    issuing, by the mobile device, a second notification upon detection of the vehicle in the critical zone in order to stop the vehicle from encountering the detected path event.

2. The method of claim 1, wherein the at least one facial aspect comprises at least one of gaze direction, facial direction, or eye position.

3. The method of claim 1 further comprising determining a mobile device placement position within the vehicle to capture the at least one facial aspect and the path view visible ahead, the mobile device placement position being determined using the at least one first camera and the at least one second camera.

4. The method of claim 1, wherein the environment details are associated with environment around the vehicle and the vehicle details are associated with the vehicle.

5. The method of claim 4, wherein the environment details are retrieved from a database or by using the at least one second camera, the environment details comprise at least one of road condition, weather condition, or traffic condition.

6. The method of claim 4, wherein the vehicle details are retrieved from a vehicle management system onboard the vehicle, the vehicle details comprise at least one of brake conditions, tire condition, tire pressure, speed of the vehicle, or loaded weight of the vehicle.

7. The method of claim 1, wherein the driver details may be extracted based on at least one of the at least one facial aspect of the driver, at least one biometric data associated with the driver, or a driver database comprising details associated with a plurality of drivers.

8. The method of claim 1, wherein the driver response may be determined based on at least one of biometric data associated with driver or changing vehicle attribute comprising at least one of vehicle deceleration, vehicle acceleration, or sudden vehicle orientation change.

9. The method of claim 1, wherein the notification comprises at least one of a warning message, a warning sound, or a course correction audio message.

10. A mobile device for warning a driver of a vehicle, the mobile device comprising:
    a processor;
    at least one first camera coupled to the processor and being configured to capture at least one facial aspect of the driver;
    at least one second camera coupled to the processor and being configured to capture a path view visible ahead of the vehicle up to a predefined distance; and
    a memory communicatively coupled to the processor, the at least one first camera, and the at least one second camera, wherein the memory stores processor instructions, which, on execution, causes the processor to:
        identify, using image analytics, a field of view of the driver based on the at least one facial aspect and identify at least one path event demanding attention of the driver based on the path view and the identified field of view of the driver;
        detect absence of a driver response in response to identifying the at least one path event within the field of view of the driver;
        extract driver details associated with the driver; and
        determine a warning zone and a critical zone, with respect to a location of the identified path event, in response to the detected absence of the driver response,
            wherein the warning zone is determined based on the extracted driver details and the critical zone is determined based on environment details and vehicle details associated, with the vehicle,
            wherein a sum of depths of the determined warning zone and critical zone is same as a distance of the vehicle from the location of the identified path event, and
            wherein the depths of the determined warning, zone and the critical zone is dynamically adjusted based on the extracted driver details, the environment details, and the vehicle details;
        issue a first notification to the driver based on the driver details, when the vehicle enters the warning zone in order to stop the vehicle from entering the critical zone; and issue a second notification upon detection of the vehicle in the critical zone in order to stop the vehicle from encountering the detected path event.

11. The mobile device of claim 10, wherein the at least one facial aspect comprises at least one of gaze direction, facial direction, or eye position.

12. The mobile device of claim 10, wherein the environment details are associated with environment around the vehicle and the vehicle details are associated with the vehicle.

13. The mobile device of claim 12, wherein the environment details are retrieved from a database or by using the at least one second camera, the environment details comprise at least one of road condition, weather condition, or traffic condition.

14. The mobile device of claim 12, wherein the vehicle details are retrieved from a vehicle management system onboard the vehicle, the vehicle details comprise at least one of brake conditions, tire condition, tire pressure, speed of the vehicle, or loaded weight of the vehicle.

15. The mobile device of claim 10, wherein the driver details are extracted based on at least one of the at least one facial aspect of the driver, at least one biometric data associated with the driver, or a driver database comprising details associated with a plurality of drivers.

16. The mobile device of claim 10, wherein the driver response is determined based on at least one of biometric data associated with driver or changing vehicle attribute comprising at least one of vehicle deceleration, vehicle acceleration, or sudden vehicle orientation change.

17. The mobile device of claim 10, wherein the notification comprises at least one of a warning message, a warning sound, or a course correction audio message.

18. A non-transitory computer-readable storage medium having stored thereon, a set of computer-executable instructions causing a computer comprising one or more processors to perform steps comprising:

capturing at least one facial aspect of the driver;

capturing a path view visible ahead of the vehicle up to a predefined distance;

identifying, using image analytics, a field of view of the driver based on the at least one facial aspect and identifying at least one path event demanding attention of the driver based on the path view and the identified field of view of the driver;

detecting absence of a driver response in response to identifying the at least one path event within the field of view of the driver;

extracting driver details associated with the driver; and determining a warning zone and a critical zone, with respect to a location of the identified path event, in response to the detected absence of the driver response, wherein the warning zone is determined based on the extracted driver details and the critical zone is determined based on environment details and vehicle details associated with the vehicle, wherein a sum of depths of the determined warning zone and critical zone is same as a distance of the vehicle from the location of the identified path event, and wherein the depths of the determined warning zone and the critical zone is dynamically adjusted based on the extracted driver details, the environment details, and the vehicle details;

issuing a notification to the driver based on the driver details, when the vehicle enters the warning zone in order to stop the vehicle from entering the critical zone; and issuing a second notification upon detection of the vehicle in the critical zone in order to stop the vehicle from encountering the detected path event.

\* \* \* \* \*